(12) United States Patent
Bushida et al.

(10) Patent No.: US 6,795,483 B1
(45) Date of Patent: Sep. 21, 2004

(54) OPTICAL COMPONENT DRIVING DEVICE IN LASER APPARATUS

(75) Inventors: Satoru Bushida, Oyama (JP); Motoharu Nakane, Oyama (JP)

(73) Assignee: Komatsu, Ltd., Tokyo (JP)

(*) Notice: Subject to any disclaimer, the term of this patent is extended or adjusted under 35 U.S.C. 154(b) by 0 days.

(21) Appl. No.: 09/648,780

(22) Filed: Aug. 28, 2000

(51) Int. Cl.$^7$ .............................................. H01S 3/08
(52) U.S. Cl. ......................... 372/197; 372/65; 30/329; 74/424.71
(58) Field of Search ............................. 372/7, 65, 98, 372/109

(56) References Cited

U.S. PATENT DOCUMENTS 5,053,670 A * 10/1991 Kosugi ....................... 310/328
2003/0019314 A1 * 1/2003 Kawamura et al. ...... 74/424.71

* cited by examiner

*Primary Examiner*—Leon Scott, Jr.
(74) *Attorney, Agent, or Firm*—Welsh & Katz, Ltd.

(57) ABSTRACT

In a laser apparatus, precision of wavelength control, wavelength stability and speed of wavelength control are increased, and an optical component is prevented from being polluted. A ball screw is used a feed screw of a feed screw mechanism that changes the orientation angle of the optical component.

1 Claim, 4 Drawing Sheets

OPTICAL COMPONENT DRIVING DEVICE IN LASER APPARATUS

BACKGROUND OF THE INVENTION

1. Field of the Invention

The present invention relates to a driving device which changes the orientation angle of optical components in laser apparatus.

2. Description of the Related Art

When an excimer laser or molecular fluorine F2 laser is used as a stepper light source, the oscillated laser light must be subject to line-narrowing. Also, in order to prevent the central wavelength of the spectrum of the oscillated laser light with narrowed linewidth from being deviated from the target value during exposure, stability control must be performed precisely.

FIG. 4(a) shows a construction surrounding a line-narrowing unit 9 mounted on a conventional laser apparatus, Alternate long and short dash lines in FIG. 4(a) show optical axes of laser light L. FIG. 4(b) is a cross-sectional view taken along line IV—IV in FIG. 4(a).

The linewidth narrowing effect is achieved by reflecting the laser light at a certain fixed angle of incidence (angle of reflection) $\phi$ relative to a reflector-type wavelength selecting element, or grating 2, installed inside the line-narrowing unit 9. The reflector-type wavelength selecting element 2 is an optical component that selects a wavelength by reflecting the laser light L. Reflector-type wavelength selecting element 2 select a wavelength that corresponds to the angle of incidence (angle of reflection) $\phi$. The angle of incidence $\phi$ is determined by the orientation angle $\theta$ of the reflection mirror 3 which totally reflects the incident laser light L and directs it unto the reflector-type wavelength selecting element 2. The orientation angle $\theta$ of reflection mirror 3 is changed by linear movement of a feed screw 16a (male screw) of the feed screw unit 16 in the directions of arrows B. With rotational movement of a control motor 8 as shown by arrow C, the feed screw 16a moves linearly.

During exposure the control motor 8 is drive controlled so as to make the deviation of the central wavelength of the oscillated laser spectrum to be extremely small. Specifically, clockwise or anticlockwise rotation of the drive shaft 8a of the control motor 8, as shown by arrows C, makes the feed screw 16a to rotate in the same direction C as the drive shaft 8a. Rotation of the feed screw 16a results in its reciprocal movement in the direction of arrow B, thus determining the feed position of the feed screw 16a. This, in turn, determines the orientation angle $\theta$ of the reflection mirror 3 and the angle of incidence $\phi$ of the light relative to the reflector-type wavelength selecting element 2, ad the central wavelength of the laser light L spectrum is thereby fixed at the target wavelength.

Here, a so-called high-precision screw is used for the feed screw unit 16. The high-precision feed screw is machined so as to make the clearances between the feed screw 16a (male screw) and the nut 16b (female screw) to be extremely small. Specifically, each pair of feed screw 16b and nut 16b is managed by spot goods control. To reduce the contact friction between the feed screw 16a and the nut 16b, a lubricant (grease) is applied in abundant quantity onto a part D where the feed screw 16a and the nut 16b are contact with each other.

However, even if the thread clearances in the feed screw unit 16 can be made very small by spot goods control, it is structurally impossible to make them extremely small, and very small thread clearances inevitably exist In other words, the backlash in the feed screw unit 16 cannot be completely eliminated. Therefore, when the control motor 8 rotates back and forth in the direction of arrows B, and the feed screw 16a moves reciprocally in the directions of arrows B, precision of positioning the reflection mirror 3 is impaired, and if the precision of positioning the reflection mirror 3 is impaired, precision of controlling wavelength of laser light T, to be a target value is impaired, resulting in impaired wavelength stability. In other words, there is a problem of decreased precision in controlling wavelength and decreased wavelength stability.

Another drawback of the conventional feed screw unit 16 is that due to very small thread clearances, significant friction resistance exists during operation of the feed screw unit 16. This leads to increased rotation torque of control motor 8 that is necessary for driving the feed screw unit 16. This results in poor linear movement response of the feed screw 16a to the drive command to the control motor 8, and a considerable time is required to change the wavelength of the laser light 1, to the target wavelength. Therefore, there is a problem of decreased speed of wavelength control.

In order to decrease the friction resistance during operation of the feed screw unit, it is necessary to apply an abundant quantity of a lubricant on contact section T). However, contact section D communicates with the interior of the line-narrowing unit 9. The excimer laser light L of deep ultraviolet wavelength zone scatters within the line-narrowing unit 9. This deep ultraviolet light irradiates the lubricant and may promote the chemical decomposition reaction of the lubricant. If the decomposition reaction of the lubricant proceeds, the impurities thereby produced will pollute optical components located inside the line-narrowing unit 9, and the performance of the laser apparatus may be impaired. Therefore, there is a problem of poor performance of the laser apparatus resulting from pollution of optical components.

OBJECTS AND SUMMARY OF THE INVENTION

With the foregoing in view, it is an object of the present invention to improve precision of wavelength control and wavelength stability, to increase speed of wavelength control and to prevent optical components from being polluted.

To achieve this object, the present invention provides an optical component driving device provided in a laser apparatus, comprising an optical component (3) that changes wavelength of the laser light (L) in accordance with an orientation angle ($\theta$)thereof, and a feed screw mechanism (6) that convert rotational movement of a rotary actuator (8) into linear movement of a feed screw (6a), the orientation angle ($\theta$) of the optical component (3) being changed in accordance with the near movement of the feed screw (6a) of the feed screw mechanism (6), characterized in that the feed screw (6a) of the feed screw mechanism (6) is a ball screw (6a).

The present invention will be described with reference to FIGS. 1(a) and 1(b).

The ball screw unit 6 is a feed screw mechanism that is used by previously applying a load (pre-load) between a ball screw 6a and a nut 6b and in which the ball screw 6a moves linearly by the sliding of the ball. This construction permits to make the mechanical screw clearances to be very small, thus making it possible to eliminate the backlash of the ball screw unit 6, or to make it non-backlash. Since there is no screw clearance, it is possible to improve the precision of positioning the reflection mirror 3 when the control motor 8 rotates clockwise and anticlockwise as shown by arrows C, and the screw 16*a* moves reciprocally a shown by the arrows B. Better precision of positioning of the reflection mirror 3 results in improvement in precision of controlling the wavelength of the laser light L to the target wavelength, and improvement in wavelength stability Since the ball screw 6*a* is caused to move linearly by the sliding of the balls, friction resistance during operation of the ball screw unit 6 is low. Therefore, smaller torque of the control motor 8 is required to drive the ball screw unit 6. As a result, linear movement response of the ball screw 6*a* to the drive command to the control motor 8 can be increased, while the time required for adjustment of the wavelength of the laser light T, to the target value can be reduced.

Furthermore, due to better wavelength control precision and reduced time of adjustment of light wavelength to the target value, the speed of wavelength control can be increased.

Due to low friction resistance of the ball screw unit 6, the amount of lubricant applied to contact portion D can be minimized. As a result, in spite of deep ultraviolet light irradiating the lubricant, the amount of resulting impurities is negligible. This makes it possible to minimize pollution of optical components located inside the line-narrowing unit 9 and to prevent deterioration of the laser apparatus performance.

DETAILED DESCRIPTION OF THE PREFERRED EMBODIMENTS

Figures 1A, 1B:
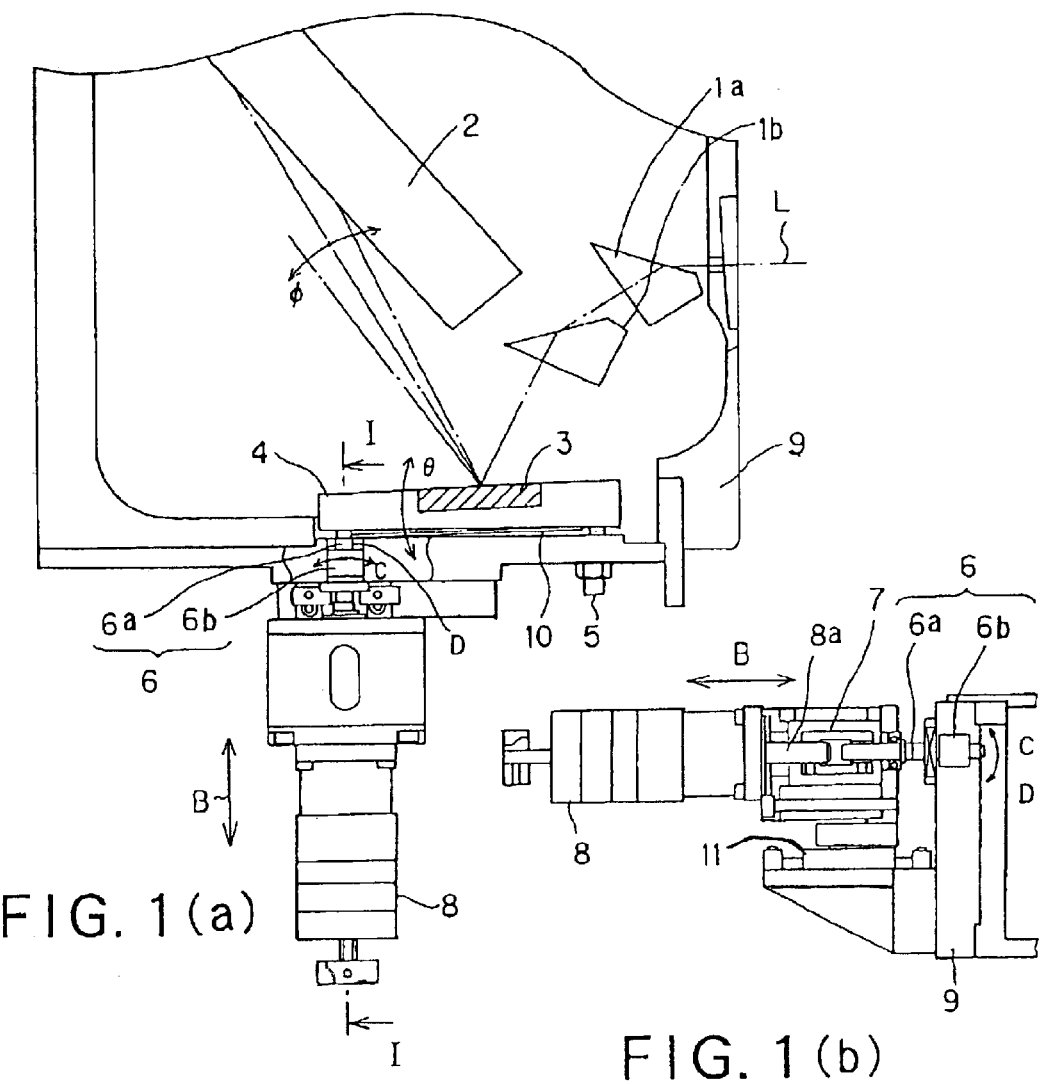
FIG. 1(*a*) is a diagram showing an embodiment of an optical component driving device, and FIG 1(*b*) is a cross-sectional view taken along line I—I in FIG. 1(*a*)

An embodiment of the optical component driving device provided in the laser apparatus of the present invention will be described below with reference to figures. It is assumed that in this embodiment the laser apparatus is used as a stepper light source.

FIG. 1(*a*) shows the embodiment of the optical component driving device. FIG. 1(*a*) shows the construction surrounding the line-narrowing unit 9 mounted on the laser apparatus. Alternate long and short dash lines in FIG. 1(*a*) show optical axes of the laser light L. FIG. 1(*b*) is a cross-sectional view taken along line I—I in FIG. 1(*a*).

Firstly, functions of the line-narrowing unit 9 used in the laser apparatus will be described.

The laser light L oscillated by discharge excitation in a laser chamber (not shown) is amplified by causing the laser light to travel reciprocally within a resonator that is constituted from a front mirror and the line-narrowing unit 9, and then emitted from the front mirror as a laser light with a prescribed power. In this embodiment, the laser light T, travels reciprocally between the front mirror and the reflector-type wavelength selecting element 2.

Optical components consisting of, for example, two prisms 1*a* and 1*b* a reflection mirror (total reflection mirror) and a reflector-type wavelength selecting element (grading) 2 are provided inside the line-narrowing unit 9. Incidentally, any number of the prisms can be provided as desired. The prisms 1*a*, 1*b* and the reflector-type wavelength selecting element 2 are fixed on the bottom plate of the line-narrowing unit 9 The reflection mirror 3 is held by d reflection mirror holding member (mirror holder) 4. The reflection mirror holding member 4 is supported rotatably by a supporting member 5 As the reflection mirror holding member 4 turns around the point at which it is supported by the supporting member 5, the orientation angle θ of the reflection mirror 3 changes according to the turning thereof. A driving mechanism that turn the reflection mirror holding member 4 and changes the orientation angle θ of the reflection mirror 3 will be described later.

The laser light L oscillated in the laser chamber enters the line-narrowing unit 9 and passes through the prisms 1*a*, 1*b* that act as beam expanders, whereby the beam width of the laser light L is expanded. The expanded laser light L impinges the reflection mirror 3 and, after being fully reflected, impinges on the reflector-type wavelength selecting element 2. The laser light L impinging upon the reflector-type wavelength selecting element 2 is diffracted, and only a part of the laser light I, with a prescribed wavelength is sent back in the same direction as the incident light. The beam width of the laser light L that has been sent back by the reflector-type wavelength selecting element 2, is reduced by the prisms 1*b*, 1*a*, and then enters the laser chamber. After the laser light L has been passed through the laser chamber and amplified, a part thereof is outputted by way of the front mirror as an output light, while the rest past is returned to the laser chamber and amplified.

When the laser apparatus is used as a stepper source, linewidth of the oscillated laser light must be narrowed. A stable and precise adjustment must be ensured to prevent the central wavelength in the spectrum of this oscillated laser light with narrowed linewidth from being deviated from the target value during exposure.

The linewidth is narrowed using the reflector-type wavelength selecting element 2. As stated above, the reflector-type wavelength selecting element 2 selects a wavelength by reflecting the incident laser light L. The reflector-type wavelength selecting element 2 selects a wavelength corresponding to the angle of incidence (angle of reflection) φ The angle of incidence φ depends on the orientation angle θ of the reflection mirror 3 that directs the laser light I, to the reflector-type wavelength selecting element 2.

Now the construction of the driving mechanism that changes the orientation angle θ of the reflection mirror 3 will be described.

The orientation angle θ of the reflection mirror holding member 4 is changed by the driving of the ball screw unit. 6 which is a feed screw mechanism. The ball screw unit 6 consists of a ball screw 6*a* and a nut 6*b*. The ball screw unit 6 is a feed screw mechanism in which the ball screw 6*a* moves linearly relative to the nut 6*b* by the sliding of the ball. One end of the ball screw 64*a* buts on the reflection mirror holding member 4. A flat spring 10 exerts a spring force on the reflection mirror holding member 4 in the direction in which the ball screw 6a abuts on the reflection mirror holding member 4.

the other end of the ball screw 6a is connected through a coupling 7 to the drive shaft 8a of the control motor 8. The nut 6b is in thread engagement the ball screw 6a and is fixed on the wall of the line-narrowing unit 9.

The control motor 8 is a stepping motor, a servo motor or the like, supported on a guide mechanism 11, such as LM guide, so as to be able to freely reciprocate in the direction of arrows B. The guide mechanism 11 is fixed to the outside of the line-narrowing unit 9.

Next, the operation of the optical component driving device will be described.

During exposure, the control motor 8 is controlled so as to make deviations of the, central wavelength in the spectrum of the oscillated laser light to be extremely small. The control can be a feedback control of the open-loop control. When the feedback consul is used, wavelength of the oscillated laser light is detected and inputted through the feedback loop to a controller (not shown).

The controller outputs a drive control signal to the control motor 8. In response to this drive control signal, the drive shaft 8a rotates clockwise or counter-clockwise as indicated by arrows C.

When the drive shaft 8a of the control motor 8 rotates in the direction of arrow C, the ball screw 6a rotates in the same direction C. As a result, the ball screw 6a moves linearly in the direction of arrows B relative to the nut 6b, i.e. relative to the line-narrowing unit 9. The ball screw 6a moves linearly in the directions of arrows B together with the control motor 8 that is connected to the ball screw 6a through the coupling 7. The control motor 8 moves along the guide of the guide mechanism 11 is the directions of arrows B.

When the hill screw 6a moves linearly relative to the line-narrowing unit 9 as described above, the reflection mirror holder 4 abutting on the ball screw 6a is pivoted on the supporting member 5. As a result, the orientation angle θ of the reflection mirror 3 is changed. Thus, the reflection mirror 3 is positioned at a position corresponding to the linear movement position of the ball screw 6a.

When the orientation angle θ of the reflection mirror 3 is determined, then the angle of incidence φ in respect to the reflector-type wavelength selecting element 2 is determined and the central wavelength in the spectrum of the laser light L is fixed corresponding thereto.

Next, the advantages of the present invention will be described with reference to FIGS. 2 and 3.

In this embodiment, a ball screw unit 6 is used as a feed screw mechanism.

The ball screw unit. 6 is a feed screw mechanism in which a load (pre-load) is previously applied between the ball screw 6a and out 6b, and the ball is screw 6a is moved linearly by the sliding of the balls. This makes it structurally possible to make mechanical thread clearance to be extremely small. Thereby, the back-lash of the ball screw unit 6 can be nullified, in other words, non back-lash ball screw unit can be realized Since there is no screw clearance, the precision of positioning of the reflection mirror 3 can be improved, when the control motor 8 rotates clockwise and anticlockwise as shown by arrows B and the feed screw 16a moves linearly in the directions of arrows B. Higher precision of positioning of the reflection mirror 3 results in higher precision in controlling the laser light L to the target wavelength and higher wavelength stability.

Figure 2:
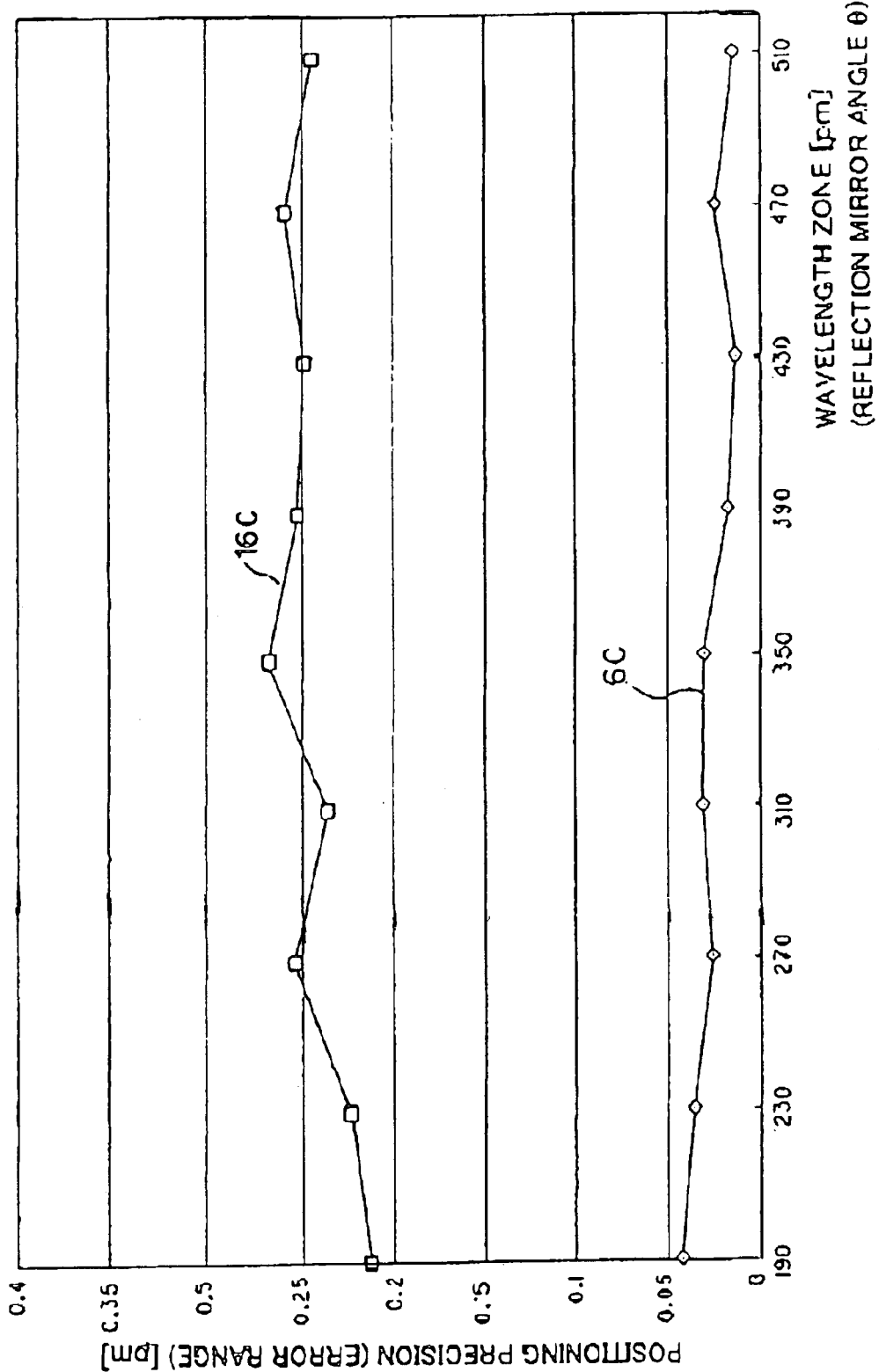
FIG. 2 is a graph showing the advantages of the device according to the embodiment of the present invention, wherein wavelength zones of the laser light are plotted on the horizontal axis, and error ranges for the wavelength control of laser light are plotted on the vertical axis.
Figures 4A, 4B:
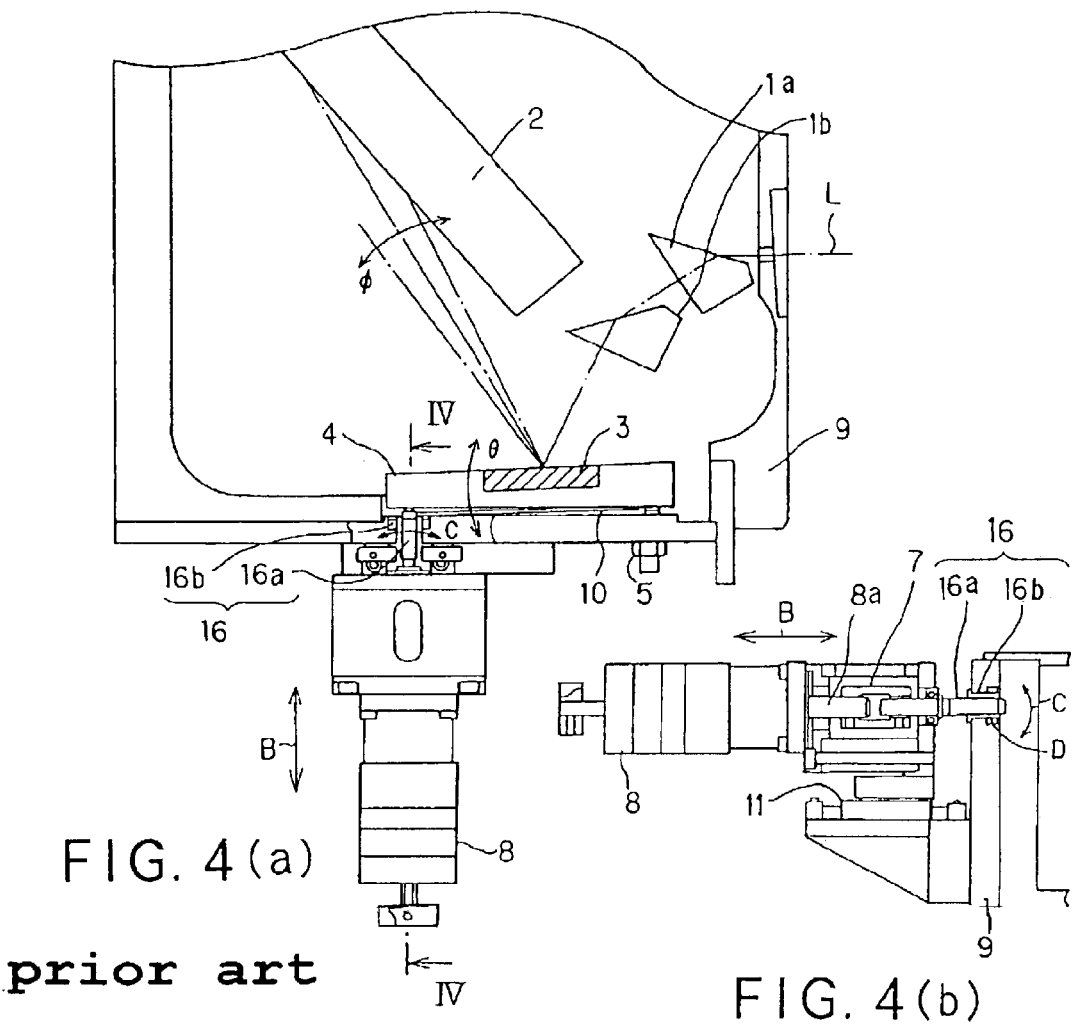
FIG. 4(*a*) is a diagram showing a conventional optical component driving device, and FIG. 4(*b*) is a cross-sectional view taken along line IV—IV in FIG. 4(*a*).

FIG. 2 is a graph showing in comparison the difference in effects between the device of this embodiment shown in FIG. 1(a) and the conventional device shown in FIG. 4(a). On the horizontal axis, wavelength zones (in pm) of the laser light L are plotted that correspond to the orientation angles 0 of the reflection mirror 3, and on the vertical axis, precision of positioning of the reflection mirror 3, i.e. error ranges (in pm) with respect to the target wavelength of the laser light L is plotted. Specifically, an error range is shown for each wavelength zone, when the orientation angle θ of the reflection mirror 3 is changed by 12 pm. Characteristics of the device of this embodiment using the ball screw 6 is shown by 6C and characteristics of the conventional device using the precision screw 16 is shown by 16C.

As is obvious from a comparison of characteristics 6C and 16C, in all wavelength zones the error ranges of the device of this embodiment are smaller than These of the conventional device, and wavelength control precision and wavelength stability are also higher in the device of this embodiment compared lo the conventional device.

Furthermore, in the device of this embodiment, because the ball screw 6a is moved linearly by the sliding of the balls, the fiction resistance during operation of the ball screw unit 6 is low. As a result, the torque of the control motor 8 required for driving the ball screw unit 6 can be small. Therefore, the responsibility of the linear movement of the ball screw 6a to the driving command to the control motor 8 is improved, and time required for adjustment of the wavelength of the laser light L to the target wavelength can be reduced.

Moreover, due to reduced time required for adjustment of the wavelength of the laser light L to the target wavelength, the speed of the wavelength control can be increased.

Figure 3:
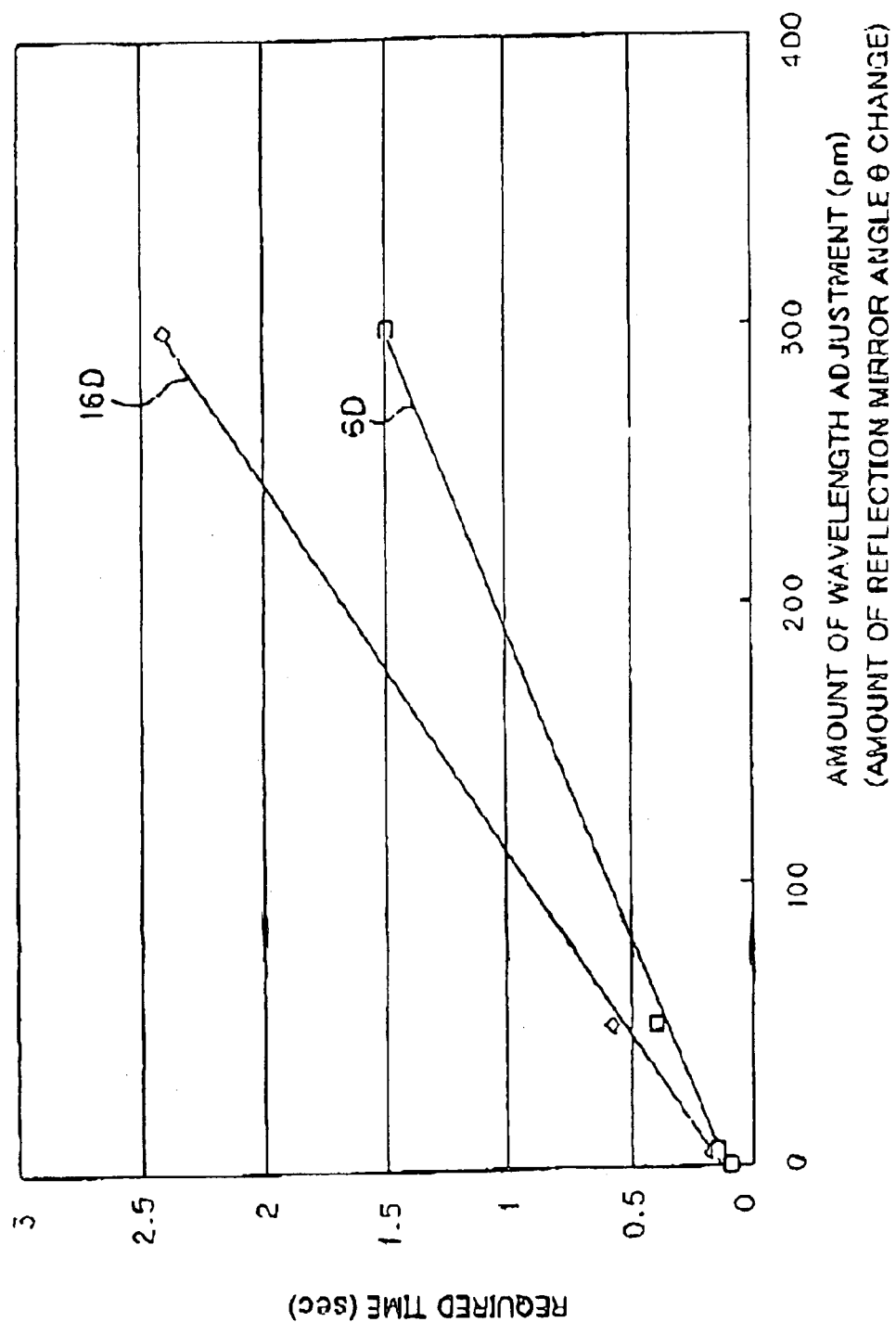
FIG. 3 is a graph showing advantages of the device according to the embodiment, wherein amounts of adjustment of a laser light wavelength are plotted on the horizontal axis and time periods required for these adjustments are plotted on the vertical axis.

FIG. 3 is a graph showing in comparison on the difference in effects between die device of this embodiment shown in FIG. 1(a) and the conventional device shown in FIG. 4(a). On the horizontal axis, amounts of wavelength adjustment (in pm) of the laser light L air, plotted that correspond to the amounts of change of the orientation angle θ of the reflection mirror 3, and on the vertical axis, time periods required for adjusting the wavelength of the laser light L to the target wavelength (in sec) are plotted. Characteristics of the device of this embodiment using the ball screw 6 are shown by 6D and characterizes of the conventional device using the precision screw 16 are shown by 16D.

As is obvious from comparison of characteristics 6D and 16D, the required time of the device of this embodiment is shorter than that of the conventional device, while wavelength adjustment speed is higher than that of the conventional device.

Furthermore, in the device of this embodiment, due to lower friction resistance during operation of the ball screw unit 6, the amount of lubricant applied to contact portion D can be minimized and as little as possible. As a result in spite of deep ultraviolet light irradiating the lubricant, amount of resulting impurities is very little, and pollution of optical components located inside the line-narrowing unit 9 can be minimized, whereby deterioration in performance of the laser apparatus can be prevented.

To the laser apparatus according to the present embodiment as described above, it is possible to improve wavelength control precision and wavelength stability and to increase wavelength control speed, as well as to prevent pollution of optical components.

Moreover, according to the present embodiment, the angle of incidence φ to the reflector-type wavelength selecting element 2 is changed by changing the orientation angle θ of reflection mirror 3 that is used as the optical component, and thereOby the wavelength of the oscillated laser light L is changed. However, the wavelength of the oscillated laser light L may be changed in a similar manner by changing the orientation angle of any other optical component than the reflection mirror.

For example, it is also possible to adjust the wavelength of the laser light by changing orientation angles of prisms 1a, 1b, or by changing orientation angle of the reflector-type wavelength selecting element 2. In such case, too, if the ball screw unit 6 is used as a driving mechanism for driving optical components in the same manner as in this embodiment, the same advantages as in this embodiment can be achieved, such as higher precision higher wavelength control speed.

What is claimed is:

1. A wavelength selecting device for a laser beam, comprising:

a mirror reflecting a laser beam incident thereon;

a wavelength selecting reflector that receives the laser beam reflected at the mirror with an incident angle and reflects to the mirror a laser beam having a wavelength corresponding to the incident angle;

a rotary actuator for generating a rotational movement; and a ball screw unit having a ball screw connected to the rotary actuator and in contact with the mirror, for converting the rotational movement of the rotary actuator into a linear movement of the ball screw so that an orientation of the mirror is changed corresponding to the linear movement of the ball screw, thereby to change the incident angle of the laser beam that is reflected at the mirror and is incident on the wavelength selecting reflector.

\* \* \* \* \*